United States Patent
Fukumoto

[11] Patent Number: 6,129,128
[45] Date of Patent: Oct. 10, 2000

[54] HEAVY DUTY RADIAL TIRE WITH STEEL CORD BEAD REINFORCING PLY

[75] Inventor: Tetsuhiro Fukumoto, Kobe, Japan

[73] Assignee: Sumitomo Rubber Industries, Ltd., Hyogo-ken, Japan

[21] Appl. No.: 08/964,860

[22] Filed: Nov. 5, 1997

[30] Foreign Application Priority Data

Nov. 20, 1996 [JP] Japan ................................. 8-309502

[51] Int. Cl.<sup>7</sup> ........................... B60C 15/00; B60C 15/06
[52] U.S. Cl. ........................ 152/543; 152/539; 152/546; 152/547; 152/549; 152/552; 152/554
[58] Field of Search .................................. 152/539, 543, 152/546, 547, 549, 552, 554, 542

[56] References Cited

FOREIGN PATENT DOCUMENTS

| 0317488 | 5/1989 | European Pat. Off. . |
| 0736400 | 10/1996 | European Pat. Off. . |
| 2024119 | 1/1980 | United Kingdom . |

OTHER PUBLICATIONS

*Patent Abstracts of Japan*, vol. 018, No. 136 (M–1572), Mar. 7, 1994 & JP 05 319035 A (Yokohama Rubber Co Ltd), Dec. 3, 1993.

*Patent Abstracts of Japan*, vol. 017, No. 472 (M–1470), Aug. 27, 1993 & JP 05 112109 A (Bridgestone Corp), May 7, 1993.

*Patent Abstracts of Japan*, vol. 095, No. 008, Sep. 29, 1995 & JP 07 117419 A (Toyo Tire & Rubber Co Ltd), May 9, 1995.

*Primary Examiner*—Adrienne C. Johnstone
*Attorney, Agent, or Firm*—Birch, Stewart, Kolasch & Birch, LLP

[57] ABSTRACT

A heavy duty radial tire comprises a radial carcass ply turned up around bead cores from the axially inside to outside of the tire, and a steel cord bead reinforcing ply disposed along the axially outer surface of the carcass ply turnup portion. The height of the carcass ply turnup portions is 1.5 to 3.5 times the rim flange height. The bead reinforcing ply extends so that the radially inner end is disposed on the radially inside of a straight line drawn between the axially inner extreme end and the axially outer extreme end of a bead core, and the radially outer end is spaced apart from the radially outer end of the turnup portion by a radial distance of from 5 to 20 mm. The radially outer ends of the turnup portions and the radially outer ends of the bead reinforcing plies are each covered with a cap made of hard rubber having a JIS-A hardness of 75 to 85 degrees.

5 Claims, 3 Drawing Sheets

HEAVY DUTY RADIAL TIRE WITH STEEL CORD BEAD REINFORCING PLY

BACKGROUND OF THE INVENTION

1. Field of the Invention

The present invention relates to a pneumatic radial tire for heavy duty use improved in the bead durability.

2. Description of Related Art

In heavy duty tires for trucks, buses and the like, the tire pressure is relatively high and the carcass cord tension which pull the carcass turnup portion (f) radially inwardly as shown in FIG. 4 is also high. Further, the tire load is relatively high. The sidewall portion (d) and bead portion (e) are repeatedly subjected to large bending deformation during running, and the stress concentrates on the end (h) of the turnup portion (f) of the carcass (g), and the end (h) is liable to separate from the surrounding rubber to greatly decrease the durability.

Thus, to prevent such a separation failure, conventionally, a bead reinforcing layer (k) shown in FIG. 4 is disposed in the bead portion (e) to secure the carcass ply between the bead core (j) and this layer (k). This bead reinforcing layer (k) however, involves another problem, that is, separation failure at the axially inner end (m) and axially outer end (n) of the bead reinforcing layer (k) due to sharing stress between the carcass (g) and this layer. Further, as the rigidity of the bead portion is increased, this bead reinforcing layer has a tendency to make the rim mounting operation difficult and deteriorate the ride comfort. This is especially remarkable when steel cords are used in the reinforcing layer.

SUMMARY OF THE INVENTION

It is therefore, an object of the present invention to provide a heavy duty radial tire in which separation failures at reinforcing cord ply ends in the bead portions are effectively prevented to improve the durability of the bead portions without deteriorating ride comfort and rim mounting.

According to one aspect of the present invention, a radial tire for heavy duty use comprises a tread portion, a pair of axially spaced bead portions with a bead core therein, a pair of sidewall portions extending between the tread edges and the bead portions, a radial carcass ply extending between the bead portions through the tread portion and sidewall portions and turned up around the bead cores from the axially inside to outside of the tire to form a pair of turnup portions and a main portion therebetween, the height of the radially outer ends of the turnup portions being 1.5 to 3.5 times the height of a rim flange of a standard rim for the tire, a bead reinforcing ply of steel cords disposed along the axially outer surface of each said turnup portion, the bead reinforcing ply extending so that the radially inner end is disposed on the radially inside of a straight line drawn between the axially inner extreme end and the axially outer extreme end of the bead core, and the radially outer end is spaced apart from the radially outer end of the turnup portion by a radial distance of from 5 to 20 mm, the radially outer ends of the turnup portions and the radially outer ends of the bead reinforcing plies are each covered with a cap made of hard rubber having a JIS-A hardness of 75 to 85 degrees, the cap covering the end of the turnup portion comprising a main part extending radially outwardly from the end so as to have a first length of 0.5 to 30 mm, an axially inner part extending radially inwardly from the end along the axially inner surface of the turnup portion so as to have a second length of 20 to 60 mm, and an axially outer part extending radially inwardly from the end along the axially outer surface of the turnup portion so as to have a third length of 5 to 30 mm, the third length being smaller than the second length.

BRIEF DESCRIPTION OF THE DRAWINGS

An embodiment of the present invention will now be described in detail in conjunction with the accompanying drawings.

DETAILED DESCRIPTION OF THE INVENTION

Figure 1:
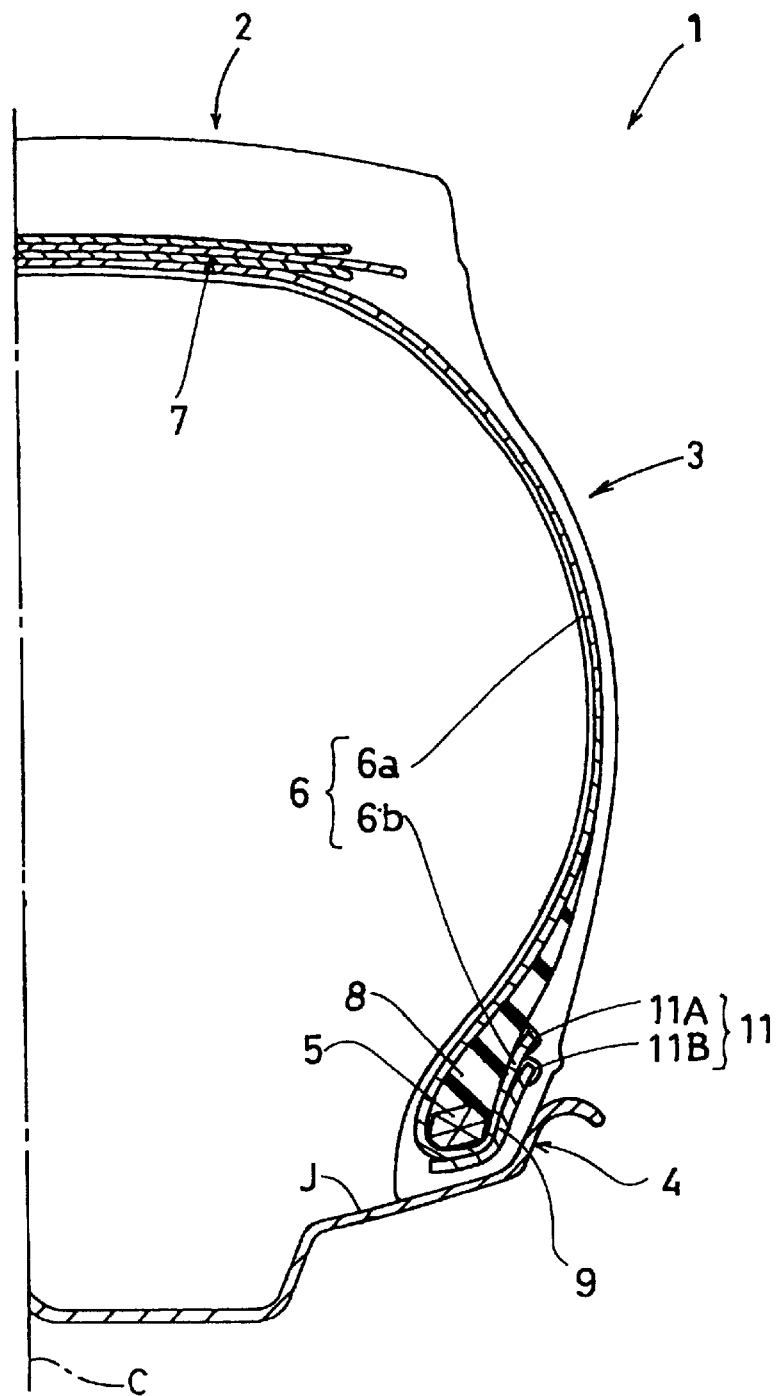
FIG. 1 is a cross sectional view of a radial tire showing an embodiment of the present invention.

In the figures, a tire 1 according to the invention is a heavy duty tubeless pneumatic radial tire for trucks and buses, to be mounted on a 15 degrees taper center drop rim.

The tire 1 comprises a tread portion 2, a pair of axially spaced bead portions 4, a pair of sidewall portions 3 extending between the tread edges and the bead portions 4, a pair of bead cores 5 disposed one in each of the bead portions 4, a toroidal carcass 6 extending between the bead portions 4, a belt 7 disposed radially outside the carcass 6 and inside a rubber tread.

The belt 7 comprises a plurality of breaker plies, in this example three plies, of parallel cords laid at angles of from 10 to 40 degrees with respect to the tire equator C. For the belt cords, steel cords and organic fiber cords, e.g. nylon, rayon, aromatic polyamide and the like can be used.

The carcass 6 comprises at least one ply, in this example only one ply, of cords arranged radially at an angle of from 85 to 90 degrees with respect to the tire equator C, which ply extends between the bead portion 4 through the tread portion 2 and sidewall portions 3 and turned up around the bead core 5 in each bead portion 4 from the axially inside to the outside to form a pair of turnup portions 6b and a main portion 6a therebetween. For the carcass cords, steel cords and organic fiber cords, e.g. polyester, nylon, rayon, aromatic polyamide and the like can be used.

The height P of the radially outer end E of the carcass ply turnup portion 6b is 1.5 to 3.5 times the height H of the flange of the rim (J). These heights are measured from the bead base line L under a standard condition in which the tire is mounted on the standard rim (J) and inflated to a normal inner pressure. If the height P is less than 1.5 times the flange height H. a separation failure is liable to occur at the outer end E because the turnup portion 6b can not endure a radially inward tensile force when the tire is inflated. If the height P is more than 3.5 times the flange height H, the outer end E approaches the central region of the sidewall portion 3 where bending deformation is large, and the stress concentrated on the outer end becomes too large to control.

Each of the bead portions 4 is provided between the carcass main portion 6a and turned up portion 6b with a bead apex 8 made of a rubber compound tapering radially outward from the bead core 5 and having a JIS-A hardness of 50 to 65 degrees. The bead apex 8 extends radially outward beyond the radially outer end E of the carcass ply turnup portion 6b and reaches to a radial height of from about ⅓ to ½ of the tire section height.

Further, each of the bead portions 4 is provided with a bead reinforcing layer 9. The bead reinforcing layer 9 is composed of one ply of steel cords laid at an angle of from 20 to 40 degrees to the adjacent carcass cords and embedded in a topping rubber. The bead reinforcing layer 9 extends along the axially outer surface of the turnup portion 6b, and the inner end (D) thereof is disposed on the radially inside of a straight line (N), which is drawn between the axially inner extreme end (I) and axially outer extreme end (O) of the bead core 5, and axially inward of the center of gravity of the bead core 5. On the other hand, the outer end F thereof is spaced apart radially inwardly (in case shown in FIG. 2) or outwardly (not shown) from the outer end E of the carcass 6 by a distance (M) of from 5 to 20 mm.

Figure 4:
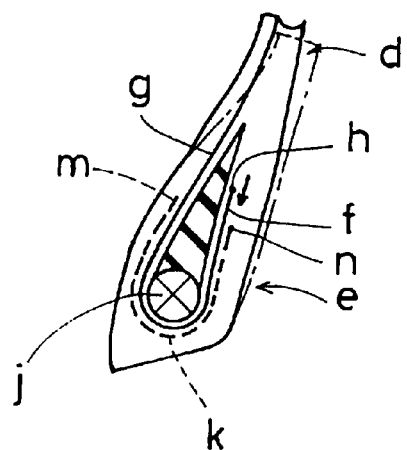
FIG. 4 is a cross sectional view showing the prior art.

Therefore, the bead reinforcing layer 9 is not provided with an axially inner part such as shown in FIG. 4, and the bead portion is prevented from being excessively increased in the rigidity. As a result, difficulty in rim mounting and separation failure at the end of the axially inner portion and deterioration in the ride comfort can be avoided. If the distance (M) is less than 5 mm, the rigidity abruptly changes near the ends E and F and separation increases. If the distance (M) is more than 20 mm, the height of the bead reinforcing layer end F approaches to the height H of the rim flange, and it becomes difficult for the bead reinforcing layer 9 to mitigate the stress on the carcass ply end E and thus separation is liable to occur at the carcass ply end E.

According to the invention, the ends of the cord plies in the bead portion, that is, the outer ends E and F of the carcass turnup portion 6b and bead reinforcing layer 9 are each covered by a rubber cap 11.

Figure 3:
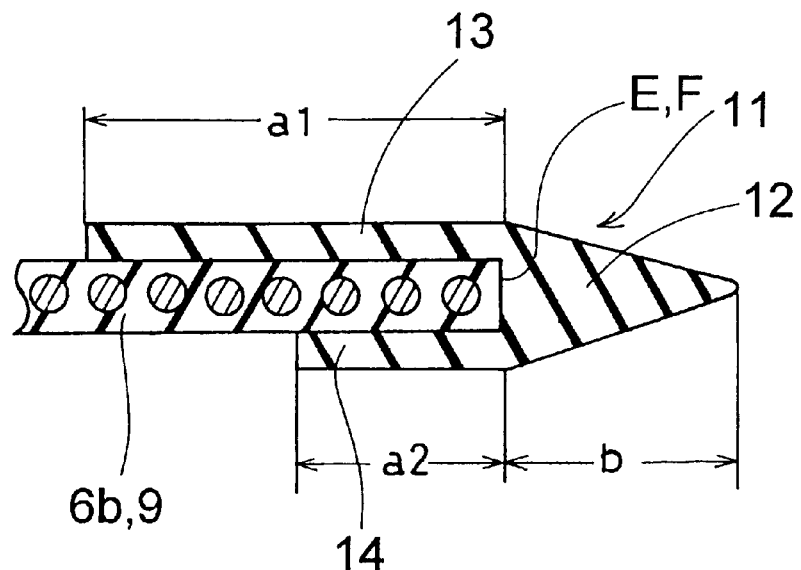
FIG. 3 is a cross sectional view of the cap.

The cap 11 is made of a hard rubber having a JIS-A hardness of from 75 to 85 degrees. As shown in FIG. 3, the cap 11 comprises a main part 12 extending radially outwardly from the reinforcing cord ply end (E, F), an axially inner part 13 extending radially inwardly from the main part 12 along the axially inner surface of the reinforcing cord ply (6b, 9), and an axially outer part 14 extending radially inwardly from the main part 12 along the axially outer surface of the reinforcing cord ply (6b, 9).

As for the cap 11A of the carcass ply 6b, the length a1 of the inner part 13A is 20 to 60 mm, and the length a2 of the outer part 14A is 5 to 30 mm, the length a2 being less than the length a1. Further, the length b of the main part 12A is 0.5 to 30 mm.

The cap 11B of the bead reinforcing layer 9 may be the same size as the cap 11A to reduce the number of tire parts. However, the inner part 12B may be shortened equally to the outer part 13B.

The bead reinforcing layer 9 which has no axial inner part as explained above, allows the carcass 6 to move more than ever. Thus, to prevent such a movement of the carcass 6, the adhesion between the turnup portion 6b and the bead apex 8 is increased by lengthening the inner part 13.

If the length a1 is less than 20 mm, the adhesion is insufficient for preventing the separation failure. If the length a2 is less than 5 mm, the adhesion between the cap and the turnup portion 6b becomes insufficient. If the length b is less than 0.5 mm, the strength of the cap 11 is insufficient for preventing the separation failure. Even if the lengths a1, a2 and b are set to be more than the respective upper limits, the effect of preventing the separation failure can not increase any more, and unfavorably the weight and rigidity are increased.

Comparison Test

Figure 2:
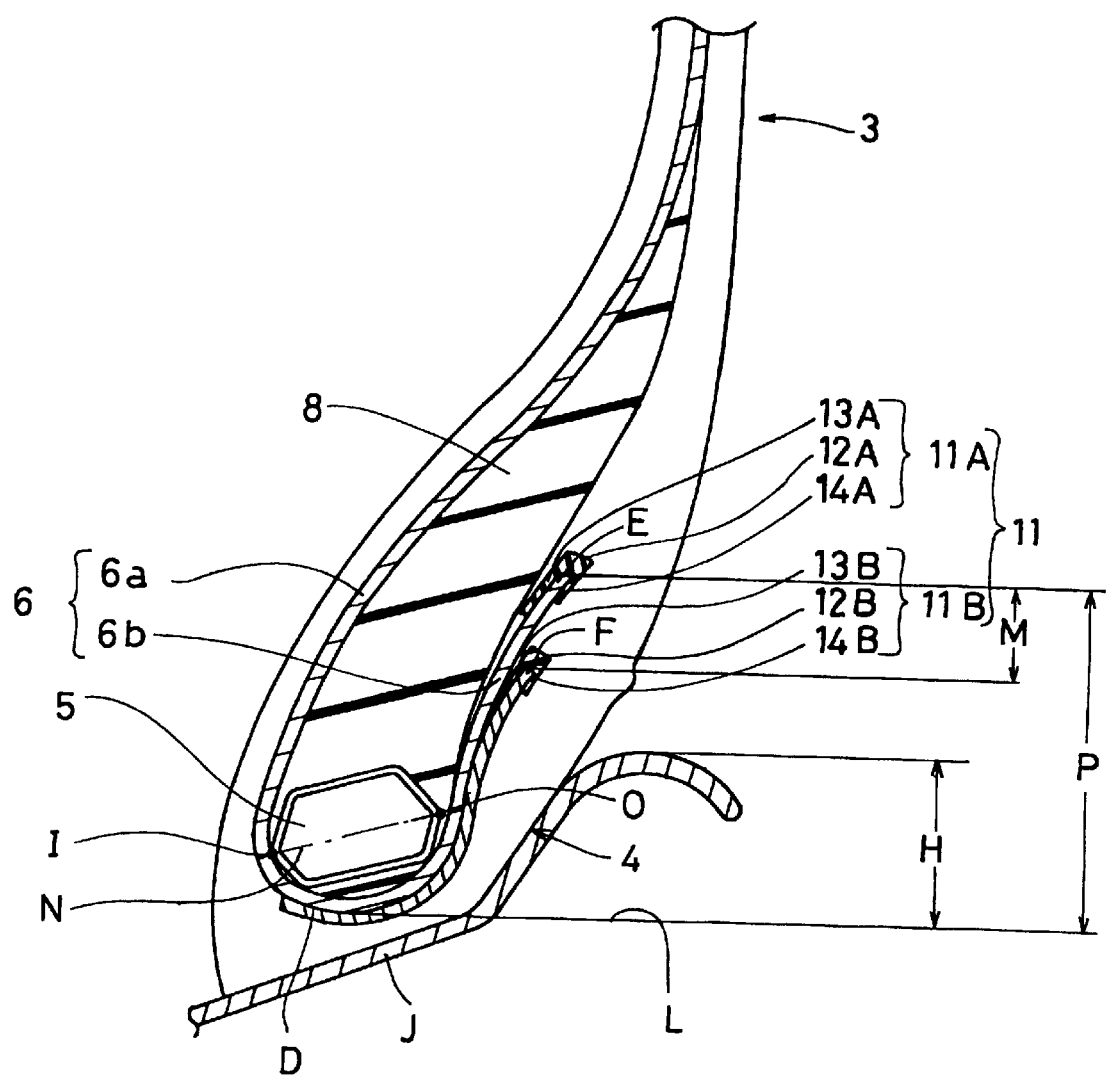
FIG. 2 is an enlarged cross sectional view of the bead portion thereof.

Test tires of size 11R22.5 having the structure shown in FIGS. 1 and 2 specifications given in Table 1 were made and tested for the durability.

In the durability test, the test tire mounted on a standard rim of 8.25×22.5 and inflated to a normal pressure of 8.44 kgf/sq.cm and loaded with 200% of the maximum load was run at a speed of 20 km/h using a drum tester, and the running time until a separation failure occurred at the outer end of the carcass turnup portion was measured. In the Table 1, the running time is indicated by an index based on that Ex. tire is 100. The larger the index, the better the durability.

It was confirmed from the test that the tire according to the invention can be improved in not only bead durability but also ride comfort.

TABLE 1

| Tire | Ex. | Ref. 1 | Ref. 2 | Ref. 3 | Ref. 4 | Ref. 5 | Ref. 6 |
|---|---|---|---|---|---|---|---|
| Carcass | | | | | | | |
| No. of ply | 1 | | | | | | |
| Turnup height P | 40 mm (Rim flange height H = 12.7 mm) | | | | | | |
| Cord angle | 85 to 90 degrees | | | | | | |
| Cord material | steel | | | | | | |
| Belt | | | | | | | |
| No. of ply | 4 | | | | | | |
| Cord angle | 50/18/18/18 degrees (inside to outside) | | | | | | |
| Cord material | steel | | | | | | |
| Bead reinforcing layer | | | | | | | |
| Cord angle | 25 to 50 degrees | | | | | | |
| Cord material | steel | | | | | | |
| Inner end position | | under bead core FIG. 1 | | | axially inward of bead core FIG. 4 | | under bead core FIG. 1 |
| Difference (M) | | 5 to 25 mm | | | 5 to 25 mm | | 0 mm |

TABLE 1-continued

| Tire | Ex. | Ref. 1 | Ref. 2 | Ref. 3 | Ref. 4 | Ref. 5 | Ref. 6 |
|---|---|---|---|---|---|---|---|
| Cap for carcass | | | | | | | |
| Length a1 (mm) | 40 | 40 | 30 | 20 | 40 | 40 | — |
| Length a2 (mm) | 20 | 40 | 30 | 30 | 20 | 20 | — |
| Difference (a1 − a2) | 20 | 0 | 0 | −10 | 20 | 20 | — |
| Length b (mm) | 10 | 10 | 20 | 10 | 10 | 10 | — |
| Durability* | 100 | 75 | 85 | 60 | 50 | 40 | 25 |

*) In Ref. 4 separation occurred on the axially inside of the bead reinforcing layer. In the others separation occurred at the carcass turnup end.

What is claimed is:

1. A heavy duty radial tire comprising
   a tread portion,
   a pair of axially spaced bead portions each with a bead core therein,
   a pair of sidewall portions extending between the tread edges and the bead portions,
   a radial carcass ply extending between the bead portions through the tread portion and sidewall portions and turned up around the bead cores from the axially inside to outside of the tire to form a pair of turnup portions and a main portion therebetween,
   the height of the radially outer ends of the turnup portions being 1.5 to 3.5 times the height of a rim flange of a standard rim for the tire,
   a bead reinforcing ply of steel cords disposed along the axially outer surface of each said turnup portion, the bead reinforcing ply extending so that
   the radially inner end is disposed on the radially inside of a straight line drawn between the axially inner extreme end and the axially outer extreme end of the bead core, and the radially outer end is spaced apart from the radially outer end of the turnup portion by a radial distance of from 5 to 20 mm,
   the radially outer ends of the turnup portions and the radially outer ends of the bead reinforcing plies are each covered with a cap made of hard rubber having a JIS-A hardness of 75 to 85 degrees,
   the cap covering the radially outer end of each turnup portion comprising
      a main part extending radially outwardly from the end so as to have a first length of 0.5 to 30 mm,
      an axially inner part extending radially inwardly from the end along the axially inner surface of the turnup portion so as to have a second length of 20 to 60 mm, and
      an axially outer part extending radially inwardly from the end along the axially outer surface of the turnup portion so as to have a third length of 5 to 30 mm, the third length being smaller than the second length.

2. The heavy duty radial tire according to claim 1, wherein the cap covering the radially outer end of each bead reinforcing ply comprises
   a main part extending radially outwardly from the end so as to have a length of 0.5 to 30 mm,
   an axially inner part extending radially inwardly from the end along the axially inner surface of the bead reinforcing ply so as to have a length of 20 to 60 mm, and
   an axially outer part extending radially inwardly from the end along the axially outer surface of the bead reinforcing ply so as to have a length of 5 to 30 mm.

3. The heavy duty radial tire according to claim 1, wherein the radially outer end of each turnup portion is located radially outward of the radially outer end of each bead reinforcing ply.

4. The heavy duty radial tire according to claim 1, wherein the radially outer end of each bead reinforcing ply is located radially outward of the radially outer end of each turnup portion.

5. The heavy duty radial tire according to claim 4, wherein in each of the bead portions, a bead apex made of a rubber compound having a JIS-A hardness of 50 to 65 degrees is disposed between the carcass main portion and turned up portion, the bead apex extending radially outward from the bead core beyond the radially outer end of the carcass ply turnup portion.

* * * * *